INVENTOR
Adolf Martin Kobiolke

Patented June 17, 1947

2,422,557

UNITED STATES PATENT OFFICE 2,422,557

PROCESS FOR SEASONING TIMBER

Adolf Martin Kobiolke, Gilderoy, Victoria, Australia

Application October 16, 1943, Serial No. 506,549
In Australia November 27, 1942

7 Claims. (Cl. 34—9.5)

1

The primary object of this invention is to provide a process whereby timber is seasoned efficiently and quickly and cracking, splitting and warping is avoided or minimised.

Another object of this invention is to provide a process whereby timber is seasoned so that the inner part is as dry as, or dryer than, the outer part thereof.

A further object of this invention is to provide a process whereby timber is seasoned in said manner so that a large percentage of the hygroscopic salts is removed, thus eliminating or substantially reducing "working" (that is expansion and contraction) due to variation in the humidity of the atmosphere and also obviating or substantially reducing "case-hardening" due to the presence of the said salts.

A still further object of this invention is to provide a timber seasoning process having the advantages of the well-known water seasoning method and obviating the disadvantages thereof.

A further object of this invention is to provide a process whereby green timber may be seasoned, as soon as it is cut, thus obviating "stacking out."

A further object of this invention is to provide a seasoning process whereby timber is ready for use immediately the seasoning process has been completed, thus obviating other treatment required wtih present known methods.

One important feature of this improved timber seasoning process is that in the final stage the timber is heated throughout and then cooled externally so that vapours are attracted from the hot interior toward the cooler exterior, the timber thus being dried from the interior outwardly.

Another important feature of this invention is that timber is seasoned rapidly without the aid of high temperature, thus ensuring that the fibres of the timber and the cellular formation thereof will be undamaged.

Another important feature of this invention is that air and/or vapours are circulated relatively to the timber in such manner that layers or stratas are obviated and uniformly seasoned timber of high quality is ensured.

Another very important feature of this invention is that the rarefied air and vapour are circulated, either transversely or longitudinally of the container; thus ensuring uniformity of heat and moisture throughout the container, and a product of uniform quality.

Another important feature of this invention is that timber of larger cross-section may be seasoned than with known processes, without undesirable effects and in relatively short time.

2

According to this invention, timber to be seasoned is hermetically sealed in a container adapted to withstand vacuum up to 28" of mercury, the timber to be treated being arranged in suitable manner to permit circulation of air, steam and water without displacement during treatment. Means are provided to supply water, air and steam to the interior of the said container and to withdraw liquid therefrom. Coils of piping are arranged in the container and means are provided to circulate hot or cold fluid through said piping for heating and cooling purposes respectively. Fans are provided to circulate vapour or air (including heated air and/or dried air) or gas, to ensure equalized temperatures and other conditions throughout the container and the contents thereof.

But in order that this invention may be understood more readily, it will be described with reference to the accompanying diagrammatic drawings wherein.

Figure 1:
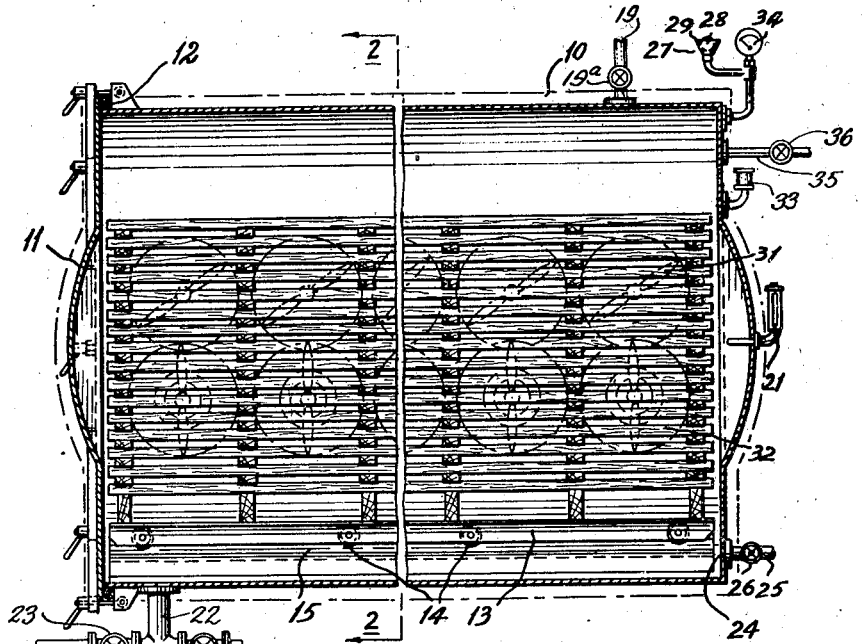
Fig. 1 is a longitudinal vertical section of a treatment chamber.
Figure 2:
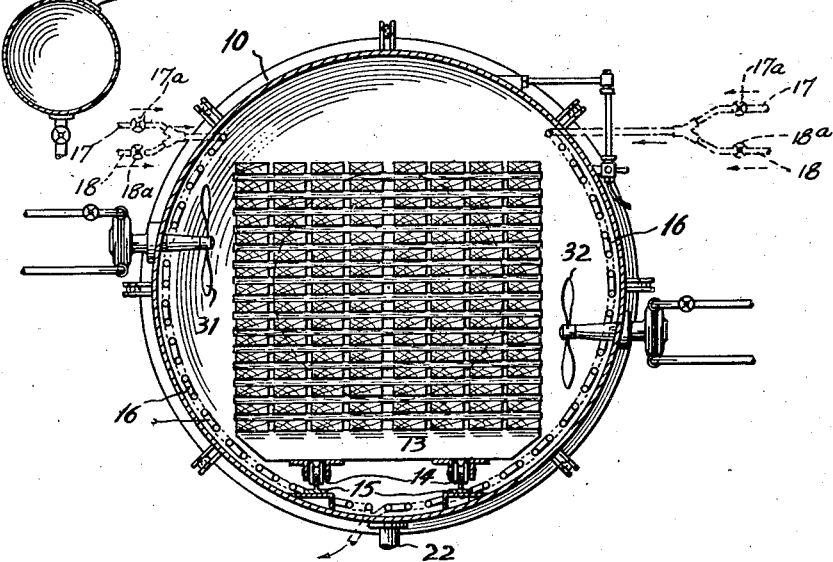
Fig. 2 is a transverse section of the said chamber.

The container may be a cylinder 10 of any suitable size to contain the timber to be treated and one end 11 thereof is removable and is provided with a resilient gasket 12 to form an airtight joint. The timber to be treated is supported in such manner that all sides thereof are exposed. One suitable support is a skeleton framing 13 supported on wheels 14 arranged to run on rails 15 near the lower part of the cylinder 10. Piping coils 16 are arranged near the casing wall and are adapted to be connected to a supply 17 and 18 of hot or cold fluid respectively as and when required by means of control valves 17a and 18a respectively.

The container is connected by pipe 19 to any suitable vacuum pump such as an ejector pump. Pipe 19 is controlled by a valve 19a. A pipe 20 controlled by a valve 20a is connected to a water supply and is adapted to feed water into the cylinder 10 as and when required. A suitable thermometer as 21 is provided to ascertain the temperature within kiln.

An outlet pipe 22 controlled by a valve 23 is provided to discharge water from container 10 as and when required.

An inlet 24 is connected to a steam supply by a pipe 25 controlled by a valve 26.

A relief valve 27 is adapted to release air or steam and prevent use of excessive pressure in the container 10. Said relief valve may include a plug or ball 28 of resilient material in a tapered seating 29. A manometer 34 is branched off the conduit leading to the relief valve 27 and an air or gas inlet pipe 35 controlled by an air or gas admission valve 36 opens into the container 10 near the top thereof.

Fans 31 and 32 are arranged in rows at spaced positions along opposite sides of the container wall, one row 31 being disposed to cause air and vapour to travel transversely through and over the upper part of the stacked timber, and the other row 32 being disposed to cause air and vapour to travel in the opposite direction through and under the lower part of the stacked timber, thus setting up a circulation of rarefied air and vapour, transversely, around and between the stacked timber.

Preparatory to the treatment of timber, the frame 13 is withdrawn from the container 10, the wheels 14 being run upon rails (not shown) positioned exteriorly of the container and aligned with the rails 15.

The timber to be treated is stocked in open arrangement as shown, upon the frame 13, vertical and horizontal spaces being provided between the adjacent lengths and around the same for circulation of air or fluid.

After the timber has been thus openly stacked upon the frame 13, the same is propelled into the container 10 and the latter is sealed by closure of the removable end 11.

The timber is then subjected to the following treatment:

(a) Air is withdrawn from the container 10 through pipe 19 until a rarefied atmosphere (hereinafter called the vacuum) up to 26" of mercury is attained and at the same time the interior of the container is heated by circulating heated fluid through the piping coils 16, to warm the timber;

(b) The suction is maintained and at the same time, valve 20a is opened and water is admitted to the container until the timber is immersed, the depth of water being indicated on gauge 33. The said water may be preheated but preferably cold water is used and is heated in the container by steam admitted through inlet 24, or by heated fluid passed through the coils 16 from the pipes 17 by way of the valves 17a to a temperature of between 85° F. and 120° F;

(c) The vacuum and the temperature of the water are increased simultaneously until the water boils turbulently, preferably with the water at a temperature between 85° F. and 120° F. and a vacuum up to 28". This operation is continued for a considerable period, determined to suit the cross sectional area of the timber and nature of the timber;

(d) The vacuum valve 19a is closed and the vacuum is broken down by admitting air or gas to the container by opening the air or gas admission valve 36 suitably disposed at a high point in the container to raise the pressure in the container to atmospheric thereby causing water to enter the cells of the timber until penetration is complete;

(e) The air admission valve (not shown) is then closed, the water is further heated and at the same time air is exhausted by re-opening vacuum valve 19a until the water again boils turbulently, the boiling being continued for a sufficient period to ensure that movement of water in the cells of the timber will dilute the tannic salts in the timber;

(f) The vacuum valve 19a is closed and the water is drawn off whereupon the valve 19a is re-opened to restore the vacuum thereby causing the warm liquid or moisture remaining in the cells of the timber to boil turbulently.

(g) The interior of the container is cooled by circulating suitable cooling fluid through the piping coils, the vapour previously given off by the boiling liquid or moisture being condensed, the vacuum valve 19a is closed and the resulting liquid withdrawn. Simultaneously fans are operated to cause the vapours to circulate within the chamber and through the spaces between the lengths of timber to equalize the temperature of the contents of the container;

(h) The valve 19a remaining closed, live steam is introduced to the chamber until temperature at the interior of the timber is about 120° F. Care must be taken to ensure that the temperature does not rise sufficiently to damage the fibres of the timber;

(i) The live steam being shut off the timber is again subjected to vacuum which is maintained until the temperature of the interior of the timber is reduced by circulating cool fluid through the coils, to about 85° F., and at the same time vapour in the container is circulated by means of fans as hereinbefore described.

(j) The timber is again heated to about 120° F., by a dry heating means (for example by circulating heated fluid through the coils arranged in the container) and the vacuum is increased until liquid in the timber cells boils violently, thus converting moisture remaining in the timber into vapour which is given off and circulated by a fan or fans as hereinbefore described. Pre-heated air or any suitable gas is then admitted at substantially atmospheric pressure to the container through the air admission valve (not shown) and circulated therein and discharged therefrom until the timber is dried to the desired condition;

(k) The container is then cooled by circulation of cooling fluid through the pipes 16 and at the same time the said air admission valve is closed and the pressure is reduced by opening the valve 19a.

The moisture content of the timber when treatment is complete is reduced as predetermined, for example, to about 11%.

Steps c and d and e to h or any one or more of them may be repeated any desired number of times to ensure that the tannic salts are substantially diluted and reduced and to otherwise condition the timber.

The important step of causing violent turbulence of the liquid and moisture in the cells of the timber and thus expelling large quantities of sap and moisture enables the seasoning process to be completed quickly and efficiently.

Another very important feature is that during step i the outside of the timber cools more rapidly than the inside thereof and the warm vapour in the interior of the timber is attracted to the cooler outer part thereof, with the result that during the final stages of the treatment, the interior of the timber becomes drier than the outer part thereof. This feature is especially important, because when the vapours are attracted from the inner part of the timber, the said inner part shrinks first and all the cells of the timber are arranged about a common centre, thus avoiding strain and stress and consequent disruption and cracking.

Any suitable means may be used to supply dried heated air or gas to the container. One suitable means (not shown) for this purpose, includes a casing in which is arranged a compact incandescent bed formed of a mixture of coke and lime or other suitable moisture absorbing material.

It will be apparent that the construction of the container, the vacuum pump, the means to supply air and steam, fans to circulate air and vapour, and the heating and cooling coils may be varied in manner well known without departing from the spirit and scope of this invention.

I claim:

1. A process for seasoning timber stacked in open arrangement in a closed chamber, comprising the steps of creating a vacuum in the chamber and passing heated fluid through tubular elements in the chamber to heat to a predetermined degree the interior of said chamber, maintaining the vacuum and admitting sufficient water to the chamber to submerge the timber, increasing the vacuum and the temperature to boil the water turbulently for a predetermined period, breaking down the vacuum in the chamber and admitting air or gas thereto until atmospheric pressure is reached to cause the water to penetrate the cells of the timber, re-heating the water and restoring the vacuum to again boil the water turbulently until the tannic salts in said cells are diluted breaking down the vacuum in the chamber, discharging the water therefrom and restoring the vacuum in said chamber to cause turbulent boiling of the liquid in said cells, passing cooling fluid through the tubular elements to cool the interior of the chamber, breaking down the vacuum in said chamber and discharging liquid therefrom, and circulating the vapors evolved by the timber to pass over and between the lengths of the same, introducing live steam into the chamber to raise the temperature of the timber to a predetermined degree, shutting off the live steam, passing cooling fluid through said tubular elements, restoring the vacuum in the chamber and circulating vapor to pass over and between the lengths of timber, again heating the timber to a predetermined degree by passing heated fluid through the tubular elements, increasing vacuum until the liquid in said cells boils violently, circulating the resulting vapors over and between the lengths of timber, breaking down the vacuum in the chamber and passing and circulating a preheated gaseous medium through the chamber to dry the timber, reducing the pressure in the chamber, and cooling said chamber by passing cooling fluid through said tubular elements.

2. Improved process for seasoning timber, according to claim 1, wherein suction is applied to the container to produce a rarefied atmosphere therein up to 28 inches of mercury.

3. Improved process for seasoning timber, according to claim 1, wherein the temperature of the water initially admitted to the chamber is increased to between about 35° F. and 120° F.

4. Improved process for seasoning timber, according to claim 1, wherein the interior of the chamber is cooled by the circulation of cooling fluid through circulatory pipes, whereby the vapor previously given off by the boiling water is condensed and withdrawn, and simultaneously circulating the vapors through the chamber in oppositely directed transverse streams, whereby the temperature and other treatment conditions of the contents of the chamber are equalized.

5. Improved process for seasoning timber, according to claim 1, wherein the live steam is introduced to the chamber until the interior of the timber is at a temperature of approximately 120° F.

6. Improved process for seasoning timber, according to claim 1, wherein the temperature of the timber is reduced to about 85 F. by the circulation of cooling fluid through the chamber whilst circulating the vapors.

7. Improved process for seasoning timber, according to claim 1, wherein the timber in the container is again heated to about 120° by circulating heated fluid through circulatory pipes in the chamber.

ADOLF MARTIN KOBIOLKE.

REFERENCES CITED

The following references are of record in the file of this patent:

UNITED STATES PATENTS

| Number | Name | Date |
|---|---|---|
| 1,328,505 | Fish | Jan. 20, 1920 |
| 1,328,657 | Fish | Jan. 20, 1920 |
| 1,760,444 | Secord | May 27, 1930 |